(12) United States Patent
Lok

(10) Patent No.: US 11,792,147 B2
(45) Date of Patent: Oct. 17, 2023

(54) COMMUNICATIONS NETWORKS

(71) Applicant: Aidan Lok, Howard Beach, NY (US)

(72) Inventor: Aidan Lok, Howard Beach, NY (US)

( * ) Notice: Subject to any disclaimer, the term of this patent is extended or adjusted under 35 U.S.C. 154(b) by 0 days.

(21) Appl. No.: 17/536,854

(22) Filed: Nov. 29, 2021

(65) Prior Publication Data
US 2023/0171215 A1 Jun. 1, 2023

(51) Int. Cl.
*H04L 51/214* (2022.01)
*H04L 67/104* (2022.01)
*H04L 67/12* (2022.01)

(52) U.S. Cl.
CPC .......... *H04L 51/214* (2022.05); *H04L 67/104* (2013.01); *H04L 67/12* (2013.01)

(58) Field of Classification Search
CPC ........ H04L 51/14; H04L 67/104; H04L 67/12
See application file for complete search history.

(56) References Cited

U.S. PATENT DOCUMENTS

| | | | |
|---|---|---|---|
| 6,829,654 B1 | 12/2004 | Jungck | |
| 6,950,823 B2 | 9/2005 | Amiri et al. | |
| 8,554,264 B1 * | 10/2013 | Gibbons | H04W 52/322 455/67.11 |
| 8,681,804 B2 | 3/2014 | Greene et al. | |
| 8,885,559 B2 | 11/2014 | Schmidt et al. | |
| 8,954,394 B2 | 2/2015 | Chan et al. | |
| 9,042,861 B2 | 5/2015 | Yoshida | |
| 9,065,679 B2 | 6/2015 | Martinez et al. | |
| 10,021,696 B2 | 7/2018 | Kalmbach et al. | |
| 10,079,754 B2 * | 9/2018 | Alexandru | H04L 45/74 |
| 10,313,925 B2 | 6/2019 | Jones et al. | |
| 10,771,524 B1 * | 9/2020 | Long | H04L 67/568 |
| 2004/0001476 A1 * | 1/2004 | Islam | H04L 67/125 370/352 |
| 2005/0108427 A1 * | 5/2005 | Datta | H04L 9/40 709/245 |
| 2009/0320102 A1 * | 12/2009 | Ou | H04L 51/58 726/4 |
| 2010/0238866 A1 * | 9/2010 | Sendrowicz | H04W 40/02 370/328 |
| 2012/0051211 A1 * | 3/2012 | Budampati | H04L 45/26 370/217 |
| 2017/0093687 A1 * | 3/2017 | Wu | H04W 40/246 |
| 2017/0257446 A1 * | 9/2017 | Bevilacqua | H04L 67/10 |
| 2018/0184261 A1 * | 6/2018 | Ameixieira | H04W 4/90 |
| 2019/0319868 A1 * | 10/2019 | Svennebring | H04W 24/08 |
| 2020/0052997 A1 * | 2/2020 | Ramanathan | H04W 4/06 |
| 2020/0059826 A1 * | 2/2020 | Horn | H04W 16/14 |
| 2021/0051583 A1 * | 2/2021 | Shikari | H04W 4/06 |
| 2021/0350691 A1 * | 11/2021 | Shah | G08B 17/10 |

* cited by examiner

*Primary Examiner* — Austin J Moreau

(57) ABSTRACT

Described herein are examples of communications networks. Communications networks may include systems, methods, and apparatuses for sending messages person-to-person, including receiving, at a processing device, from a sender device via a long range low-power wide area network connection operating via a network interface, a message including a metadata and a content; storing, using the processing device, the metadata on an electronic data storage unit; determining, using the processing device, whether the metadata matches any stored metadata on the electronic data storage unit; queueing, using the processor, the message on the electronic data storage unit; and sending, using the processing device, the queued message to a second node via the long range low-power wide area network connection.

20 Claims, 14 Drawing Sheets

COMMUNICATIONS NETWORKS

BACKGROUND

When disaster strikes, communications, and therefore the systems supporting communications, are essential. For reasons of public safety, rescue coordination, person location, situational awareness, and more, communications systems are used by people to communicate when faced with a disaster emergency. Such disasters, however, may inhibit the functioning of traditional communications infrastructure (e.g., landlines, cell towers, etc.).

BRIEF DESCRIPTION OF THE DRAWINGS

The present description will be understood more fully when viewed in conjunction with the accompanying drawings of various examples of communications networks. The description is not meant to limit the communications networks to the specific examples. Rather, the specific examples depicted and described are provided for explanation and understanding of communications networks. Throughout the description the drawings may be referred to as drawings, figures, and/or FIGS.

DETAILED DESCRIPTION

Figure 1:
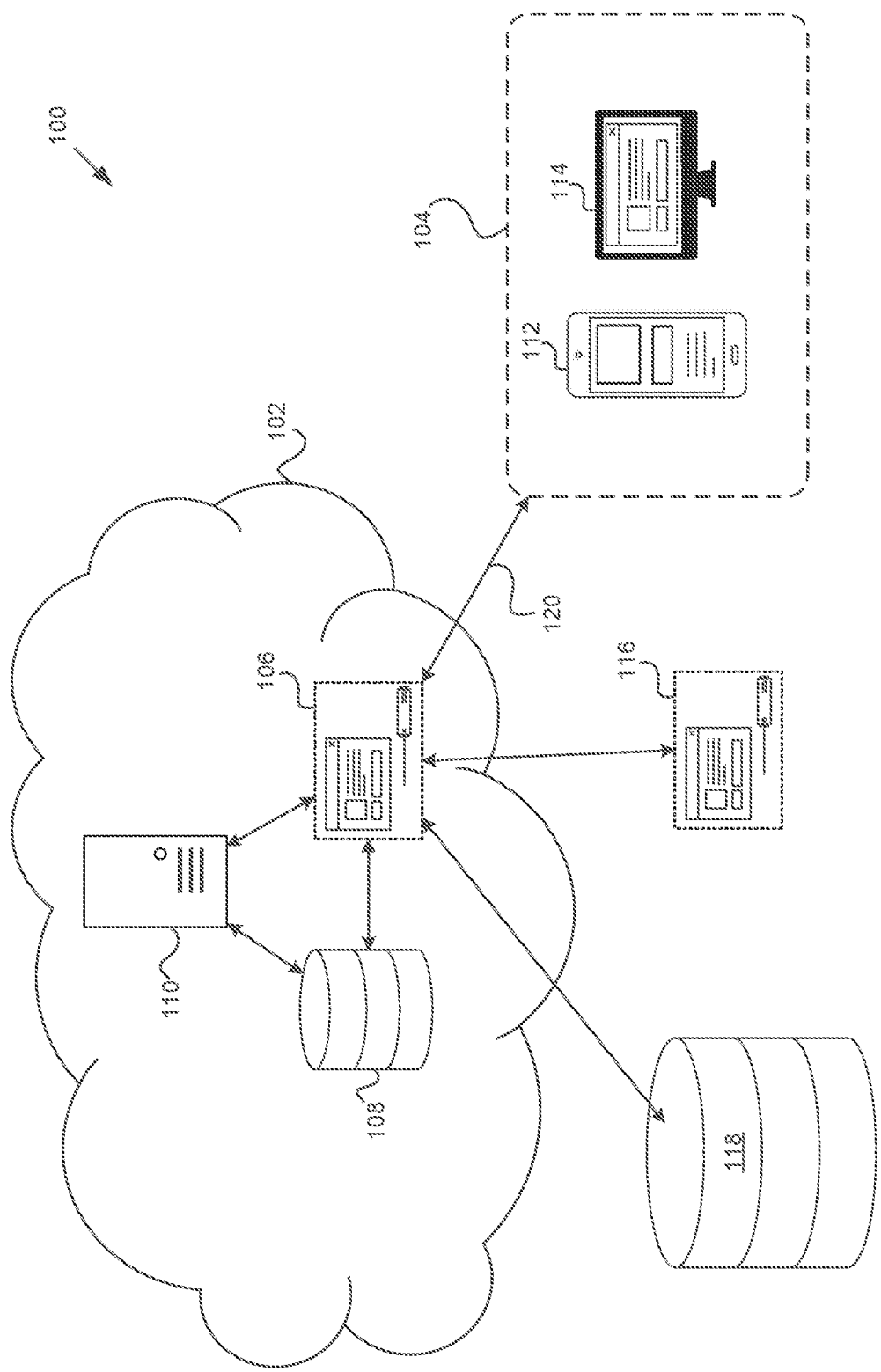
FIG. 1 illustrates a communications network system, according to an embodiment.

Communications networks as disclosed herein will become better understood through a review of the following detailed description in conjunction with the figures. The detailed description and figures provide merely examples of the various embodiments of communications networks. Many variations are contemplated for different applications and design considerations; however, for the sake of brevity and clarity, all the contemplated variations may not be individually described in the following detailed description. Those skilled in the art will understand how the disclosed examples may be varied, modified, and altered and not depart in substance from the scope of the examples described herein.

Conventional communications systems may include Public Safety and Disaster Recovery (PSDR) communications systems, such as landlines or Land Mobile Radio Push to Talk (LMR PTT). LMR PTT is a terrestrial communication technology that allows for voice communication within closed end-user groups over dedicated frequencies in the 300-3000 MHz range.

However, conventional communications devices depend heavily on infrastructure that may not be available in disaster scenarios. Landlines are unlikely to be available during disaster scenarios and installing new cables may be both time-consuming and expensive.

LMR PTT, while usable in some PSDR scenarios, may be unavailable or impractical due to the emergency. While LMR PTT handsets may have a long range, LMR PTT relies on expensive wireless base stations and bulky handheld equipment. Furthermore, currently deployed LMR PTT communication technology lacks reliability and interoperability between different manufacturers.

Implementations of communications systems may address some or all of the problems described above. A communications system may include a low-cost implementation of a human-to-human short message private network using multi-bearer internet-of-things (IoT) microcontrollers to establish a fully decentralized mesh network transport mechanism.

Given the ubiquity, flexibility, and processing power of smartphones, and their ability to run software that is extendable with downloadable applications, they provide a versatile component of a communications network. Communications networks as disclosed herein may augment a smartphone's communications capability, by obviating a shortcoming faced given a lack of working cellular towers using a series of nodes implementing low-power wide area networks (LPWANs).

LPWANs may include a class of wireless physical layer network transceivers that have long range, low cost, and low power consumption, though may be limited by low data rates. Many LPWAN implementations may have ranges of 10-40 km in rural areas and 1-5 km in urban areas while limited to data rates of 27 kbps. LPWANs usable in PSDR communication systems may include, inter alia, LoRa (Long Range), Sigfox, or NB-IoT.

LoRa may be an end-device to end-device technology that uses chirp spread spectrum encoding mechanisms to modulate the signal. The modulated signal may be resilient to noise and interference and is also very difficult to jam. LoRa may use the 900 MHz Industrial, Scientific and Medical (ISM) band in the United States, which is unlicensed spectrum and free to use. Thus LoRa may provide cost advantages over conventional systems.

System-on-a-chip (SoC) microcontroller technology may enable off-the-shelf multi-bearer IoT microcontrollers, which may meet the functionality requirement and desire for low cost to provide for a fully decentralized mesh network mechanism using LPWAN as a backhaul to achieve a large coverage area by treating each node as a repeater for a wireless PHY that is designed for long range. Furthermore, each node's hardware may be self-contained and compact, using software edge caching to allow the communications network to be quickly and easily established over a large area. The nodes may be in weather-resistant and shock-resistant packaging, and be capable of being air-dropped in a disaster area.

Embodiments of communications networks may provide a low-cost, long range, and easy-to-deploy data communication network, which may be established when a disaster impacts the functionality of existing infrastructure or when there is a lack of infrastructure to begin with as in the case of lesser developed countries. A communications network using LoRa may allow people to communicate by using smartphones to send and receive text messages without relying on the Internet connections or cell towers via a mobile application. A microcontroller having LoRa and wireless fidelity (Wi-Fi) radios may be implemented as a system on chip (SoC), where all of the electronics needed for a network node are on an integrated circuit. Each node may include, for example, a PYCOM™ LoPy4 SoC board and LoRa antenna, which may be connected via a miniature radiofrequency (e.g., U.FL) connector to a coaxial (e.g., RP-SMA) cable, which can act as a stationary repeater node or handheld node carried by users. Microcontroller firmware may manage the communication system between the smartphone and the microcontroller, as well as between multiple instances of the microcontroller. The system may be effective in various environments, including indoor, urban, suburban, and rural environments. Experimental data demonstrated that the communications networks can be used to create a data network for communication via text messages that is low cost, long range, and rapidly deployable.

Communications networks as described herein may enable emergency responders to deploy a PSDR communication system using standard smartphones that run a software application to allow the smartphones to be augmented with external long-range bearers that attach to an infrastructure composed of a multitude of repeater nodes.

Such communications networks may utilize standard, affordable smartphones. The communications networks may include a software application running on the smartphones to provide a graphical user interface (GUI) to the end-users. The software application may be specifically designed to communicate with an external hardware long-range bearer. The long-range bearer may then be used to communicate with a mesh network established by a multitude of repeater nodes. Messages input to the software application GUI may be forwarded to all other nodes on the network. The software application may then display any received messages on the GUI. Thus, an end-to-end short message private network can be established using the invented approach.

The long-range bearers may include two parts: a communication mechanism between the augment and the smartphone, as well as a communication mechanism between nodes. The communication mechanism between the augment and the smartphone may be able to recognize different messages from the smartphone and interpret these messages to perform specific tasks based on the command. The smartphone-bearer communication mechanism also must be able to command the inter-node communication mechanism to send specific messages over LoRa. The inter-node communication mechanism in the long-range bearer may be primarily responsible for sending messages the smartphone has directed it to transmit.

The repeater nodes may include an inter-node communication mechanism similar to that which is present in the long-range bearers. However, the repeater node software may be optimized to forward messages received from other nodes. The software may recognize messages and determine whether the message should not be forwarded again. A cache of all messages sent or received may be implemented to avoid broadcast storms. The inter-node communication mechanism in the repeater nodes may enable a LoRa mesh network having a total range as large as needed. Propagation delay may increase as the size of the network increases.

In an example embodiment of the microcontroller firmware, the microcontroller and the smartphone companion may communicate over Wi-Fi. A hypertext transfer protocol (HTTP) web server may only respond to specifically formatted HTTP GET and POST transactions. The microcontroller may receive user messages from a smartphone companion via HTTP POST transactions. The sender of the message, the timestamp of when the message was sent, as well as the body of the message (e.g., the message content) may be extracted from each HTTP POST request and stored in the microcontroller's memory. The list of all messages stored in the microcontroller's memory may be returned as a server response to all HTTP GET transactions.

The second component of the microcontroller firmware in the example embodiment may manage the LoRa communication system used to forward messages between network nodes. Messages received by the microcontroller from the smartphone companion over HTTP POST may be transmitted via LoRa. The microcontroller firmware may utilize a first in first out (FIFO) queue of all LoRa messages. The list of messages stored in the microcontroller's memory in the FIFO queue may be used to exclude previously seen messages. If the message is new, the microcontroller may add the message to the FIFO queue and retransmit the message over LoRa to implement an SNCF mesh network architecture.

A smartphone application may include two parts: a communication mechanism that allows the app to send messages to the long-range bearer and collect messages from the bearer and a GUI that displays received messages and allows the end-user to input messages for the app to send. The smartphone-bearer communication mechanism may function over any wireless medium using any standard protocol, but HTTP may be implemented in various embodiments. The GUI may be on the same device as the bearer communication mechanism. The GUI may have an internal data store that it uses to store and compare information that it has received from the inter-device communicator. The GUI may also instruct the communicator to gather information from the bearer so that it can present new information or messages to the user.

In the example embodiment, the smartphone application may be an HTTP client that can perform HTTP POSTs and HTTP GETs to send and receive messages, respectively. The smartphone application may send an HTTP POST request to the microcontroller when the user sends a message. The application may also send an HTTP GET request to the microcontroller every second to see if any new messages have been received over LoRa. The smartphone app may compare the received message list against a local copy. New messages may be added to the GUI if they are present in the received list but not the local copy. Thus, each node acts may function as an edge cache to synchronize messages to new users as well as users who have temporarily lost connectivity.

The user's GPS coordinates may also be transmitted with every message. The smartphone app may use the coordinates to calculate the distance between the sender and the current user.

In the example embodiment, the nodes may be designed to operate as either a smartphone accessory or as standalone repeaters. The software may be identical for both modes of operation, though different subroutines may execute to produce the desired mode of operation.

The repeater version may include a battery, while the smartphone accessory version may draw power from the phone. An example deployment methodology may be to issue a smartphone accessory node to each user. The smartphone accessory mode may enable the user to gain access to the repeater node LPWAN mesh network. Repeater nodes may then be scattered throughout the intended area of operation to provide universal coverage.

Each node may include a multi-bearer radio array, which may be implemented as a LoRa-enabled SoC microcontroller. LoRa operates on Industrial Scientific Medical (ISM) Bands, which are unlicensed spectrum. Thus, the operation of LoRa on unlicensed spectrum allows a network to be deployed without the purchase of expensive licenses for spectrum.

In experimentation, five network nodes were built and arranged in varied environments to test the effectiveness of the communication network. The terrain was modified to find the effective range of any given pair of nodes in that specific environment. The four environments tested were indoor, urban, suburban, and rural. The different terrains tested affected the range of communication across the communications network. A Wi-Fi-only microcontroller without the LoRa radio subsystem served as a control.

FIG. 1 illustrates a communications network system 100, according to an embodiment. The communications network system 100 includes internal and external data resources for managing a project. The communications network system 100 may result in reduced memory allocation at client devices and may conserve memory resources for application servers.

The communications network system 100 may include a cloud-based data management system 102 and a user device 104. The cloud-based data management system 102 may include an application server 106, a database 108, and a data server 110. The user device 104 may include one or more devices associated with user profiles of the communications network system 100, such as a smartphone 112 and/or a personal computer 114. The communications network system 100 may include external resources such as an external application server 116 and/or an external database 118. The various elements of the communications network system 100 may communicate via various communication links 120. An external resource may generally be considered a data resource owned and/or operated by an entity other than an entity that utilizes the cloud-based data management system 102 and/or the user device 104.

The communications network system 100 may be web-based. The user device 104 may access the cloud-based data management system 102 via an online portal set up and/or managed by the application server 106. The communications network system 100 may be implemented using a public Internet. The communications network system 100 may be implemented using a private intranet. Elements of the communications network system 100, such as the database 108 and/or the data server 110, may be physically housed at a location remote from an entity that owns and/or operates the communications network system 100. For example, various elements of the communications network system 100 may be physically housed at a public service provider such as a web services provider. Elements of the communications network system 100 may be physically housed at a private location, such as at a location occupied by the entity that owns and/or operates the communications network system 100.

The communication links 120 may be direct or indirect. A direct link may include a link between two devices where information is communicated from one device to the other without passing through an intermediary. For example, the direct link may include a Bluetooth™ connection, a Zigbee® connection, a Wifi Direct™ connection, a near-field communications (NFC) connection, an infrared connection, a wired universal serial bus (USB) connection, an ethernet cable connection, a fiber-optic connection, a firewire connection, a microwire connection, and so forth. In another example, the direct link may include a cable on a bus network. "Direct," when used regarding the communication links 120, may refer to any of the aforementioned direct communication links.

An indirect link may include a link between two or more devices where data may pass through an intermediary, such as a router, before being received by an intended recipient of the data. For example, the indirect link may include a wireless fidelity (WiFi) connection where data is passed through a WiFi router, a cellular network connection where data is passed through a cellular network router, a wired network connection where devices are interconnected through hubs and/or routers, and so forth. The cellular network connection may be implemented according to one or more cellular network standards, including the global system for mobile communications (GSM) standard, a code division multiple access (CDMA) standard such as the universal mobile telecommunications standard, an orthogonal frequency division multiple access (OFDMA) standard such as the long term evolution (LTE) standard, and so forth. "Indirect," when used regarding the communication links 120, may refer to any of the aforementioned indirect communication links.

Figure 2:
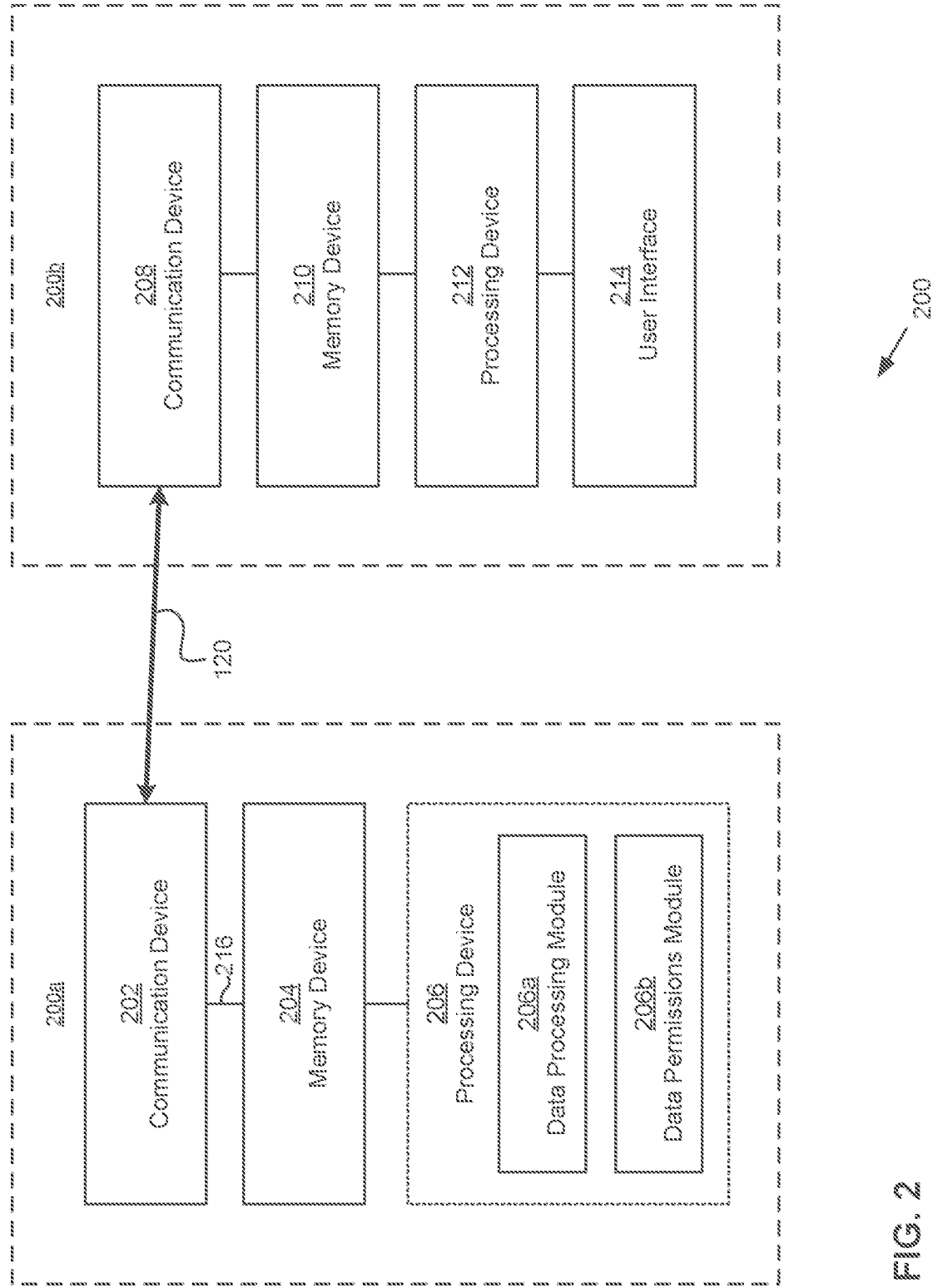
FIG. 2 illustrates a device schematic for various devices used in the communications network system, according to an embodiment.

FIG. 2 illustrates a device schematic 200 for various devices used in the communications network system 100, according to an embodiment. A server device 200a may moderate data communicated to a client device 200b based on data permissions to minimize memory resource allocation at the client device 200b.

The server device 200a may include a communication device 202, a memory device 204, and a processing device 206. The processing device 206 may include a data processing module 206a and a data permissions module 206b, where module refers to specific programming that governs how data is handled by the processing device 206. The client device 200b may include a communication device 208, a memory device 210, a processing device 212, and a user interface 214. Various hardware elements within the server device 200a and/or the client device 200b may be interconnected via a system bus 216. The system bus 216 may be and/or include a control bus, a data bus, and address bus, and so forth. The communication device 202 of the server device 200a may communicate with the communication device 208 of the client device 200b.

The data processing module 206a may handle inputs from the client device 200a. The data processing module 206a may cause data to be written and stored in the memory device 204 based on the inputs from the client device 200b. The data processing module 206a may receive data stored in the memory device 204 and output the data to the client device 200a via the communication device 202. The data permissions module 206b may determine, based on permissions data stored in the memory device, what data to output to the client device 200b and what format to output the data in (e.g., as a static variable, as a dynamic variable, and so forth). For example, a variable that is disabled for a particular user profile may be output as static. When the variable is enabled for the particular user profile, the variable may be output as dynamic.

The server device 200a may be representative of the cloud-based data management system 102. The server device 200a may be representative of the application server 106. The server device 200a may be representative of the data server 110. The server device 200a may be representative of the external application server 116. The memory device 204 may be representative of the database 108 and the processing device 206 may be representative of the data server 110. The memory device 204 may be representative of the external database 118 and the processing device 206 may be representative of the external application server 116. For example, the database 108 and/or the external database 118 may be implemented as a block of memory in the memory device 204. The memory device 204 may further store instructions that, when executed by the processing device 206, perform various functions with the data stored in the database 108 and/or the external database 118.

Similarly, the client device 200b may be representative of the user device 104. The client device 200b may be representative of the smartphone 112. The client device 200b may be representative of the personal computer 114. The memory device 210 may store application instructions that, when executed by the processing device 212, cause the client device 200b to perform various functions associated with the instructions, such as retrieving data, processing data, receiving input, processing input, transmitting data, and so forth.

As stated above, the server device 200a and the client device 200b may be representative of various devices of the communications network system 100. Various of the elements of the communications network system 100 may include data storage and/or processing capabilities. Such capabilities may be rendered by various electronics for processing and/or storing electronic signals. One or more of the devices in the communications network system 100 may include a processing device. For example, the cloud-based data management system 102, the user device 104, the smartphone 112, the personal computer 114, the external application server 116, and/or the external database 118 may include a processing device. One or more of the devices in the communications network system 100 may include a memory device. For example, the cloud-based data management system 102, the user device 104, the smartphone 112, the personal computer 114, the external application server 116, and/or the external database 118 may include the memory device.

The processing device may have volatile and/or persistent memory. The memory device may have volatile and/or persistent memory. The processing device may have volatile memory and the memory device may have persistent memory. Memory in the processing device may be allocated dynamically according to variables, variable states, static objects, and permissions associated with objects and variables in the communications network system 100. Such memory allocation may be based on instructions stored in the memory device. Memory resources at a specific device may be conserved relative to other systems that do not associate variables and other object with permission data for the specific device.

The processing device may generate an output based on an input. For example, the processing device may receive an electronic and/or digital signal. The processing device may read the signal and perform one or more tasks with the signal, such as performing various functions with data in response to input received by the processing device. The processing device may read from the memory device information needed to perform the functions. For example, the processing device may update a variable from static to dynamic based on a received input and a rule stored as data on the memory device. The processing device may send an output signal to the memory device, and the memory device may store data according to the signal output by the processing device.

The processing device may be and/or include a processor, a microprocessor, a computer processing unit (CPU), a graphics processing unit (GPU), a neural processing unit, a physics processing unit, a digital signal processor, an image signal processor, a synergistic processing element, a field-programmable gate array (FPGA), a sound chip, a multi-core processor, and so forth. As used herein, "processor," "processing component," "processing device," and/or "processing unit" may be used generically to refer to any or all of the aforementioned specific devices, elements, and/or features of the processing device.

The memory device may be and/or include a computer processing unit register, a cache memory, a magnetic disk, an optical disk, a solid-state drive, and so forth. The memory device may be configured with random access memory (RAM), read-only memory (ROM), static RAM, dynamic RAM, masked ROM, programmable ROM, erasable and programmable ROM, electrically erasable and programmable ROM, and so forth. As used herein, "memory," "memory component," "memory device," and/or "memory unit" may be used generically to refer to any or all of the aforementioned specific devices, elements, and/or features of the memory device.

Various of the devices in the communications network system 100 may include data communication capabilities. Such capabilities may be rendered by various electronics for transmitting and/or receiving electronic and/or electromagnetic signals. One or more of the devices in the communications network system 100 may include a communication device, e.g., the communication device 202 and/or the communication device 208. For example, the cloud-based data management system 102, the user device 104, the smartphone 112, the personal computer 114, the application server 116, and/or the external database 118 may include a communication device.

The communication device may include, for example, a networking chip, one or more antennas, and/or one or more communication ports. The communication device may generate radio frequency (RF) signals and transmit the RF signals via one or more of the antennas. The communication device may receive and/or translate the RF signals. The communication device may transceive the RF signals. The RF signals may be broadcast and/or received by the antennas.

The communication device may generate electronic signals and transmit the RF signals via one or more of the communication ports. The communication device may receive the RF signals from one or more of the communication ports. The electronic signals may be transmitted to and/or from a communication hardline by the communication ports. The communication device may generate optical signals and transmit the optical signals to one or more of the communication ports. The communication device may receive the optical signals and/or may generate one or more digital signals based on the optical signals. The optical signals may be transmitted to and/or received from a communication hardline by the communication port, and/or the optical signals may be transmitted and/or received across open space by the networking device.

The communication device may include hardware and/or software for generating and communicating signals over a direct and/or indirect network communication link. For example, the communication component may include a USB port and a USB wire, and/or an RF antenna with Bluetooth™ programming installed on a processor, such as the processing component, coupled to the antenna. In another example, the communication component may include an RF antenna and programming installed on a processor, such as the processing device, for communicating over a Wifi and/or cellular network. As used herein, "communication device" "communication component," and/or "communication unit" may be used generically herein to refer to any or all of the aforementioned elements and/or features of the communication component.

Various of the elements in the communications network system 100 may be referred to as a "server." Such elements may include a server device. The server device may include a physical server and/or a virtual server. For example, the server device may include one or more bare-metal servers. The bare-metal servers may be single-tenant servers or multiple tenant servers. In another example, the server device may include a bare metal server partitioned into two or more virtual servers. The virtual servers may include separate operating systems and/or applications from each other. In yet another example, the server device may include a virtual server distributed on a cluster of networked physical servers. The virtual servers may include an operating system and/or one or more applications installed on the virtual server and distributed across the cluster of networked physical servers. In yet another example, the server device may include more than one virtual server distributed across a cluster of networked physical servers.

The term server may refer to functionality of a device and/or an application operating on a device. For example, an application server may be programming instantiated in an operating system installed on a memory device and run by a processing device. The application server may include instructions for receiving, retrieving, storing, outputting, and/or processing data. A processing server may be programming instantiated in an operating system that receives data, applies rules to data, makes inferences about the data, and so forth. Servers referred to separately herein, such as an application server, a processing server, a collaboration server, a scheduling server, and so forth may be instantiated in the same operating system and/or on the same server device. Separate servers may be instantiated in the same application or in different applications.

Various aspects of the systems described herein may be referred to as "data." Data may be used to refer generically to modes of storing and/or conveying information. Accordingly, data may refer to textual entries in a table of a database. Data may refer to alphanumeric characters stored in a database. Data may refer to machine-readable code. Data may refer to images. Data may refer to audio. Data may refer to, more broadly, a sequence of one or more symbols. The symbols may be binary. Data may refer to a machine state that is computer-readable. Data may refer to human-readable text.

Various of the devices in the communications network system 100, including the server device 200a and/or the client device 200b, may include a user interface for outputting information in a format perceptible by a user and receiving input from the user, e.g., the user interface 214. The user interface may include a display screen such as a light-emitting diode (LED) display, an organic LED (OLED) display, an active-matrix OLED (AMOLED) display, a liquid crystal display (LCD), a thin-film transistor (TFT) LCD, a plasma display, a quantum dot (QLED) display, and so forth. The user interface may include an acoustic element such as a speaker, a microphone, and so forth. The user interface may include a button, a switch, a keyboard, a touch-sensitive surface, a touchscreen, a camera, a fingerprint scanner, and so forth. The touchscreen may include a resistive touchscreen, a capacitive touchscreen, and so forth.

Various methods are described below. The methods may be implemented by the data analysis system 100 and/or various elements of the data analysis system described above. For example, inputs indicated as being received in a method may be input at the client device 200b and/or received at the server device 200a. Determinations made in the methods may be outputs generated by the processing device 206 based on inputs stored in the memory device 204. Correlations performed in the methods may be executed by the correlation module 206a. Inference outputs may be generated by the inference module 206b. Key data and/or actionable data may be stored in the knowledge database 204b. Correlations between key data and actionable data may be stored in the knowledge database 204b. Outputs generated in the methods may be output to the output database 204c and/or the client device 200b. In general, data described in the methods may be stored and/or processed by various elements of the data analysis system 100.

Figure 3:
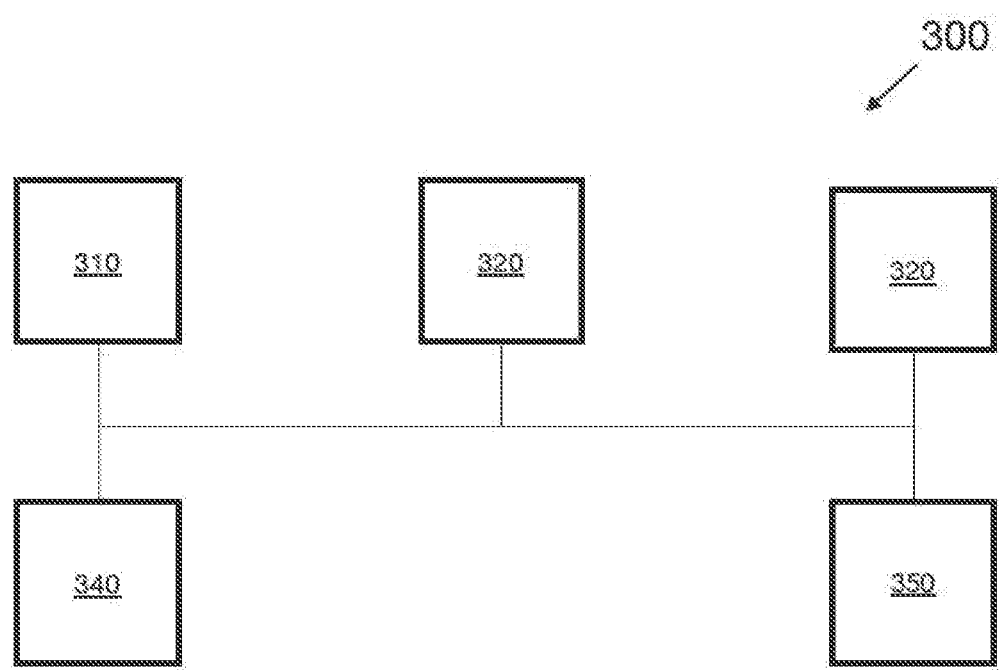
FIG. 3 illustrates a high-level block diagram of an example computer, according to an embodiment.

FIG. 3 illustrates a high-level block diagram of an example computer 300, according to an embodiment. The computer 300 may provide for inter-node communications between several nodes in a communications network.

The computer 300 may include a processor 310, which may be operatively coupled to a data storage device and memory. The processor 310 may control an overall operation of computer 300 by executing computer program instructions defining such operations. The computer program instructions may be stored in a data storage device 320, or another non-transitory computer-readable medium, and loaded into a memory 330 when execution of the computer program instructions is desired. Thus, the modules described for user interaction, inter-node communication, and other functions can be defined by the computer program instructions stored in the memory 330 and/or a data storage device 320 and controlled by the processor 310 executing the computer program instructions.

The computer 300 may include one or more network interfaces 340 for communicating with other devices via a network. The computer 300 may also include one or more input/output devices 350, which may provide for user interaction with the computer 300 (e.g., a display, a keyboard, a touchpad, a mouse, speakers, buttons, etc.).

The processor 310 may include, among others, special purpose processors with software instructions incorporated in the processor design and general-purpose processors with instructions in the storage device 320 or the memory 330, to control the processor 310, and may be a sole processor or one of multiple processors of the computer 300. The processor 310 may include a self-contained computing system, containing multiple cores or processors, a bus, memory controller, cache, etc. A multi-core processor may include a symmetric or asymmetric processor 310, a data storage device 320, and/or a memory 330 and may include, be supplemented by, or incorporated in, one or more application-specific integrated circuits (ASICs) and/or one or more field-programmable gate arrays (FPGAs). It can be appreciated that the disclosure may operate on a computer 300 with one or more processors 310 or on a group or cluster of computers networked together to provide greater processing capability.

The data storage device 320 and the memory 330 may each include a tangible non-transitory computer-readable storage medium. By way of example, such non-transitory computer-readable storage medium can include random access memory (RAM), high-speed random access memory (DRAM), static random access memory (SRAM), double data rate synchronous dynamic random access memory (DDR RAM), read-only memory (ROM), erasable programmable read-only memory (EPROM), electrically erasable programmable read-only memory (EE-PROM), flash memory, compact disc read-only memory (CD-ROM), digital versatile disc read-only memory (DVD-ROM) disks, or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

A network/communication interface 340 may enable the computer 300 to communicate with networks, such as the Internet, also referred to as the World Wide Web (WWW), an intranet and/or a wireless network, such as a cellular telephone network, a wireless local area network (LAN) and/or a metropolitan area network (MAN), and other devices using any suitable communications standards, protocols, and technologies. By way of example, such suitable communications standards, protocols, and technologies can include Ethernet, Wi-Fi (e.g., IEEE 802.11), Wi-MAX (e.g., IEEE 802.16), VLAN (e.g., IEEE 802.1Q), LPWAN (e.g., LoRa, Sigfox, NB-IoT), Bluetooth, near field communications ("NFC"), radio frequency systems, infrared, GSM, EDGE, HS-DPA, CDMA, TDMA, quadband, VoIP, IMAP, POP, XMPP, SIMPLE, IMPS, SMS, or any other suitable communications protocols. For example, the network interface 340 may enable the computer 300 to transfer data, synchronize information, update software, or any other suitable operation.

Input/output devices 350 may include peripherals, such as, for example, a printer, a scanner, a monitor, a keyboard, a mouse, a touchscreen, a trackpad, or others. The input/output devices 350 may also include parts of a computing device. In some embodiments, the computer 300 may function as a headless server computer without the input/output devices 350.

Any or all of the systems and apparatus discussed herein, including personal computers, tablet computers, hand-held devices, cellular telephones, servers, databases, cloud-computing environments, virtual computing environments, and components thereof, may be implemented using a computer such as the computer 300. An implementation of an actual computer or computer system may have other structures and may contain other components as well.

Figure 4:
FIG. 4 illustrates a multi-bearer system on chip (SoC) microcontroller computer node, according to an embodiment.

FIG. 4. illustrates a multi-bearer system on chip (SoC) microcontroller computer node 400, according to an embodiment. The SoC microcontroller computer node 400 may provide for communications between human interface devices.

The multi-bearer system on chip (SoC) microcontroller computer node 400 may be an example of a computer used to implement the inventive system. A processor 410 may be used to implement a mesh network algorithm to support the backbone of the inventive system. A memory 430 may be used to implement edge cache to support disconnected operation of associated human interface devices (HIDs) to overcome backbone connectivity issues. The network/communication interface 440 may contain multiple physical interfaces, a Wi-Fi interface 441, and a LPWAN interface 442. The Wi-Fi interface 441 may be used to communicate between node 400 and a hand-held HID (e.g., a smartphone). By way of example, such an HID can include smartphones, tablets, laptops, among others. The LPWAN interface 442 may be used to implement the backbone communication network of the inventive system.

Figure 5:
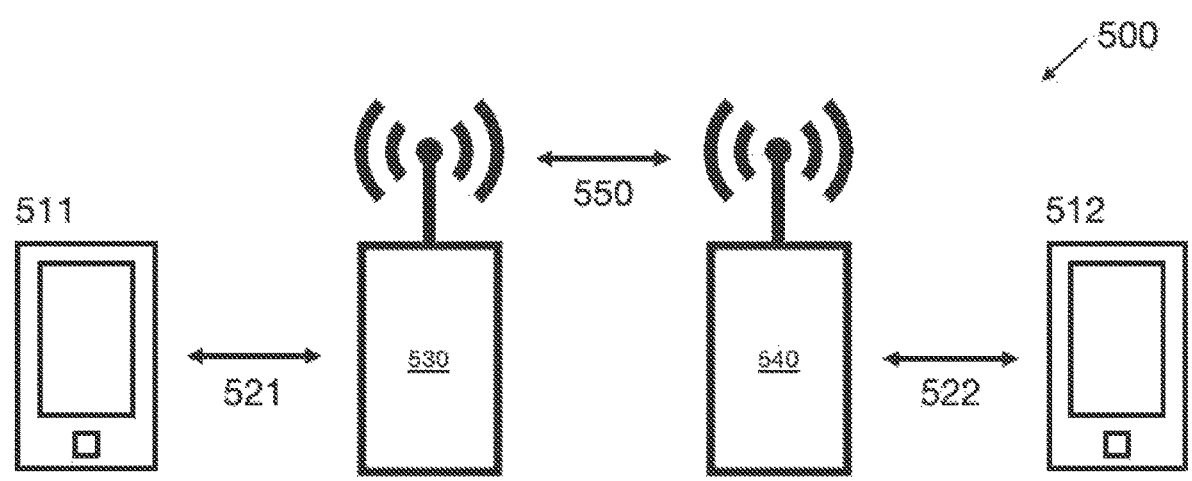
FIG. 5 illustrates an example of a communications network system, according to an embodiment.

FIG. 5 illustrates an example of a communications network system 500, according to an embodiment. The communications network system 500 may enable communications between various HIDs.

The graphical user interface (GUI) may be implemented on, for example, HIDs 511 and 512. By way of example, such HIDs can include smartphones, tablets, laptops, among others. The HIDs 511 and 512 may use Wi-Fi connections 521 and 522 to communicate with multi-bearer system on chip (SoC) microcontroller computer nodes 530 and 540. The nodes 530 and 540 distribute messages across the backbone network of the system using a LPWAN connection 550. The nodes 530 and 540 may incorporate an edge cache to support a disconnected operation of associated HIDs to overcome backbone connectivity issues.

Figure 6:
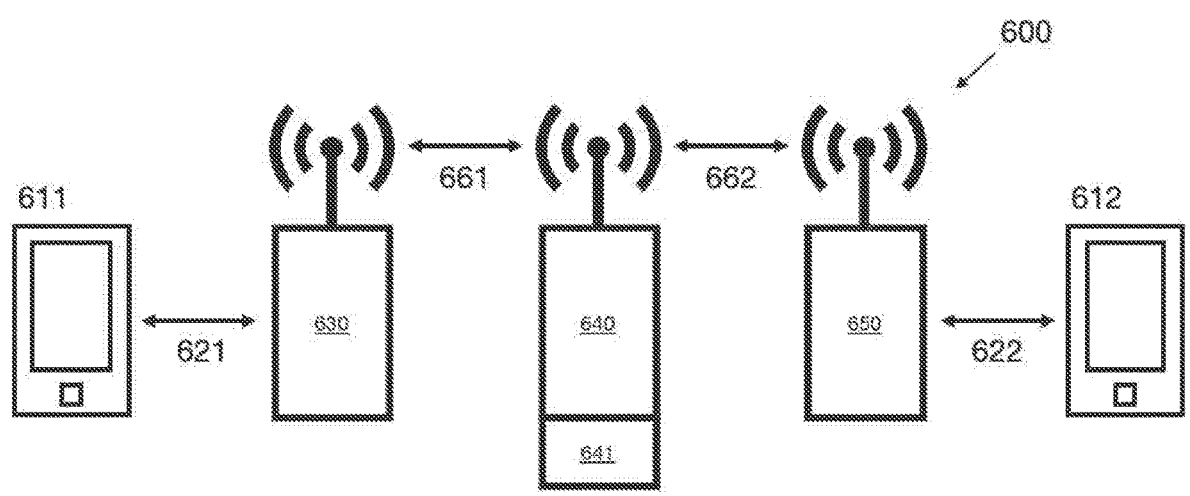
FIG. 6 illustrates an expanded example of a communications network system, according to an embodiment.

FIG. 6 illustrates an expanded example of a communications network system 600, according to an embodiment. The communications network system 600 may enable communications between various HIDs.

The GUI may be implemented on, for example, HIDs 611 and 612. By way of example, such HIDs can include smartphones, tablets, laptops, among others. The HIDs 611 and 612 may use Wi-Fi connections 621 and 622 to communicate with multi-bearer system on chip (SoC) microcontroller computer nodes 630 and 650. The nodes 630, 640, and 650 may distribute messages across the backbone network of the system using LPWAN connections 661 and 662. The nodes 630 and 650 may incorporate an edge cache to support a disconnected operation of associated HIDs to overcome backbone connectivity issues. In this expanded example, smartphone companion nodes 630 and 650 may draw power from the HIDs 610 and 670, respectively, while an infrastructure node 640, may be self-powered by a co-located battery with an optional solar charger 641.

Figure 7:
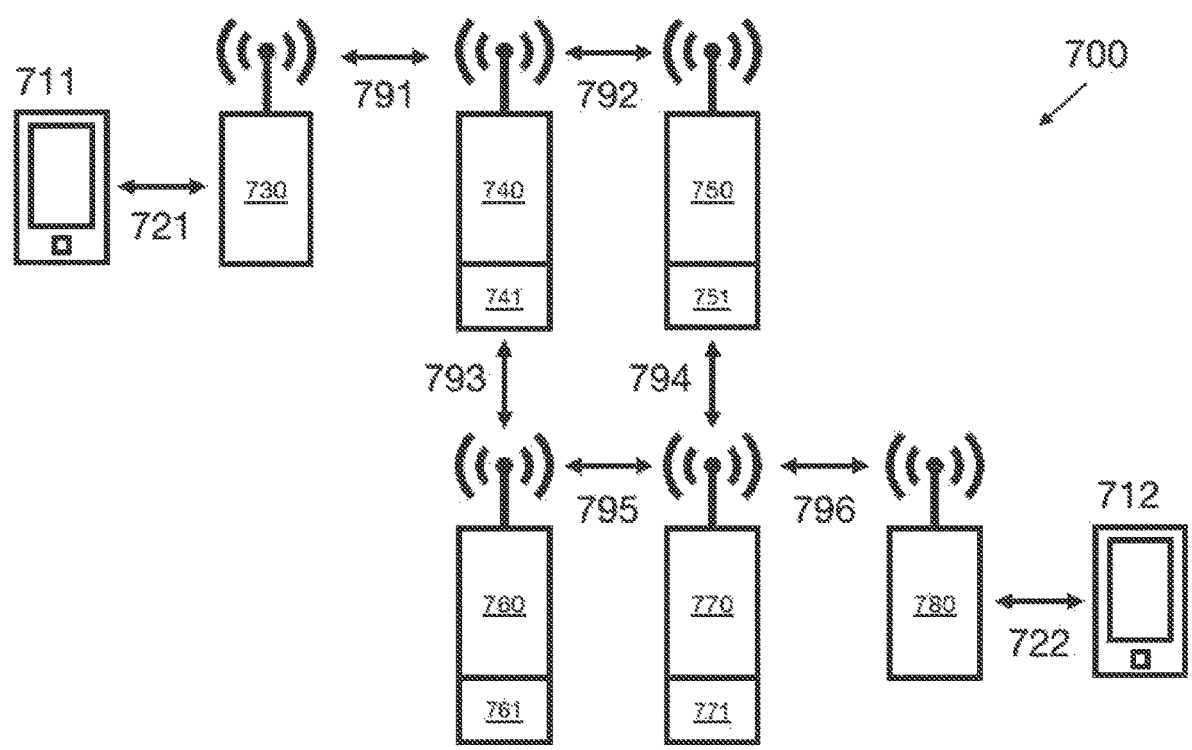
FIG. 7 illustrates an expanded example of a communications network system, according to an embodiment.

FIG. 7 illustrates an expanded example of a communications network system 700, according to an embodiment. The communications network system 700 may enable communications between various HIDs.

The GUI may be implemented on, for example, HIDs 711 and 712. By way of example, such HIDs can include smartphones, tablets, laptops, among others. HIDs 711 and 712 use Wi-Fi connections 721 and 722 to communicate with multi-bearer system on chip (SoC) microcontroller computer nodes 730 and 780. The nodes 730, 740, 750, 760, 770, and 780 may distribute messages across the backbone network of the system using LPWAN connections 791, 792, 793, 794, 795, and 796. The nodes 730 and 780 may incorporate an edge cache to support a disconnected operation of associated HIDs to overcome backbone connectivity issues. The infrastructure nodes 740, 750, 760, and 770 may form a mesh, which can be expanded infinitely. In this example, smartphone companion nodes 730 and 780 may draw power from the HIDs 711 and 712, respectively, while infrastructure nodes, 740, 750, 760, and 770, may be self-powered by a co-located battery with optional solar chargers 741, 751, 761, and 771, respectively.

Figure 8:
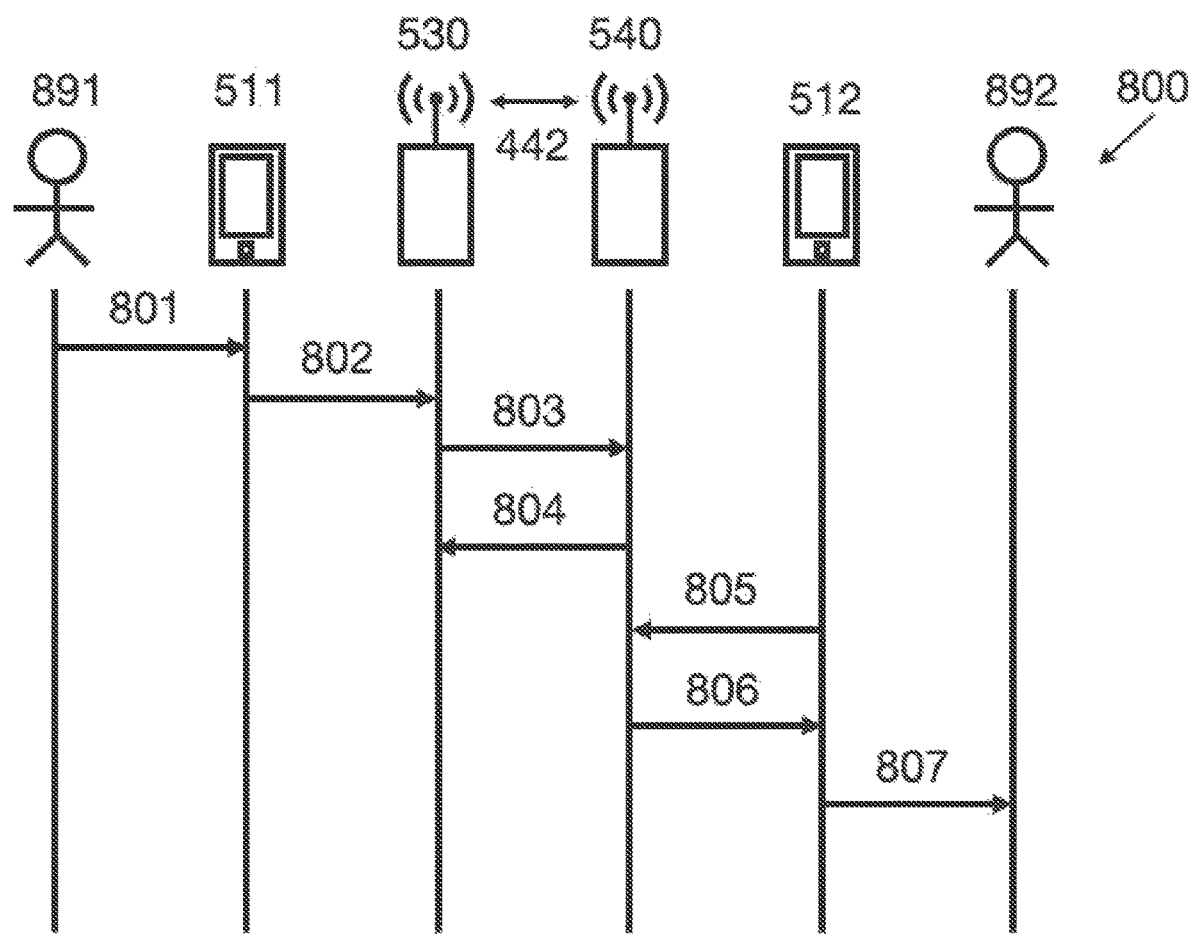
FIG. 8 illustrates a messaging sequence between users, smartphones, and smartphone companion nodes for human-to-human communication, according to an embodiment.

FIG. 8 illustrates a messaging sequence between users 891 and 892, smartphones 511 and 512, and smartphone companion nodes 530 and 540 for human-to-human communication, according to an embodiment. The messaging sequence may provide for the transport of messages between HIDs, while preventing broadcast storming or receipt of duplicate messages.

The user 891 may interact with a GUI 1100 on the smartphone 511 at 801 to send a message. The smartphone 511 may send an HTTP POST request containing the message from 801 to the smartphone companion node 530 at 802. The smartphone companion node 530 may store the received message from 802 in a local edge cache. The smartphone companion node 530 may further broadcast the message from smartphone 511 across the network using the LPWAN connection 442 at 803. The smartphone companion node 540 may receive and rebroadcast the message at 804, as the message is new, as well as store the received message in the local edge cache. The smartphone companion node 530 may receive the message but drop the message because the message is in the edge cache. The smartphone 512 may send an HTTP GET request to the smartphone companion node 540 at 805 to request the list of all messages. The smartphone companion node 540 may return the list of all messages to the smartphone 512 at 806. The smartphone 512 may then resolve the edge cache message list with the internal memory message list and present the resolved internal memory message list to the user 892 through the GUI 1100 at 807.

Figure 9:
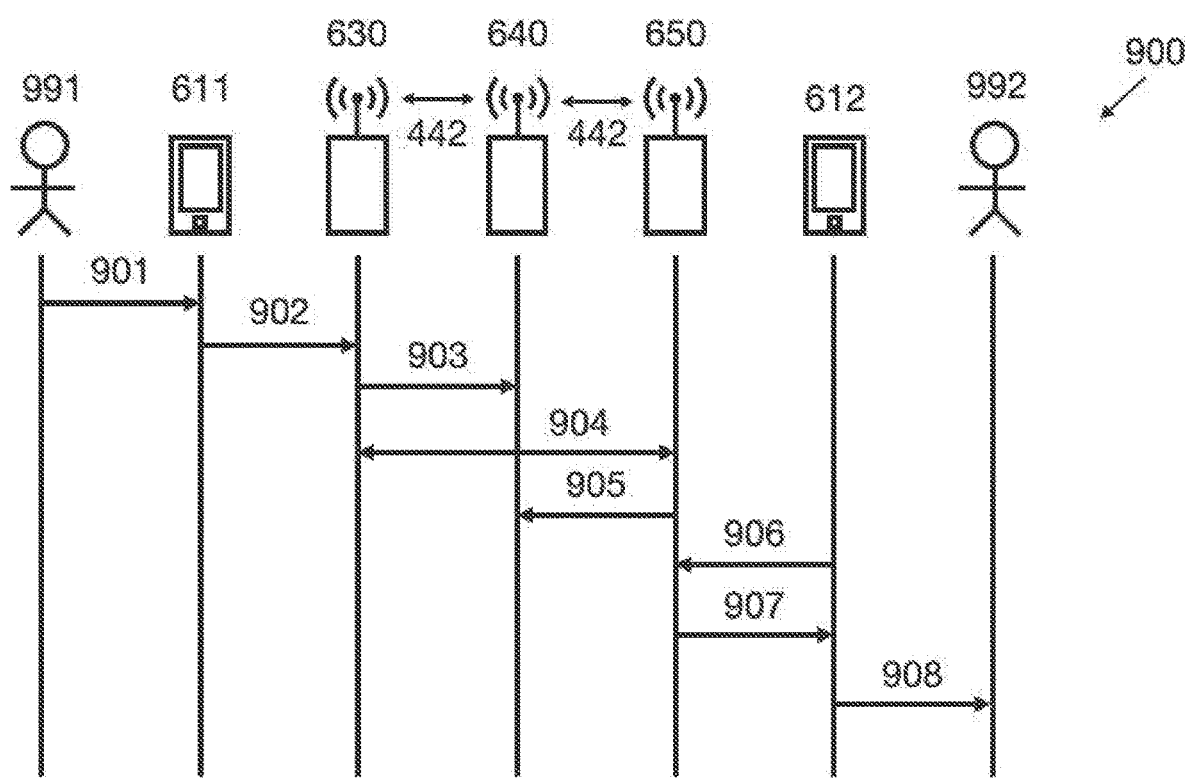
FIG. 9 illustrates a messaging sequence between users, smartphones, smartphone companion nodes, and an infrastructure node for human-to-human communication, according to an embodiment.

FIG. 9 illustrates a messaging sequence between users 991 and 992, smartphones 611 and 612, smartphone companion nodes 630 and 650, and an infrastructure node 640 for human-to-human communication, according to an embodiment. The messaging sequence may provide for the transport of messages between HIDs, while preventing broadcast storming or receipt of duplicate messages.

The user 991 may interact with a GUI 1100 on the smartphone 611 at 901 to send a message. The smartphone 611 may send an HTTP POST request containing the message from 901 to the smartphone companion node 630 at 902. The smartphone companion node 630 may store the received message from 902 in the local edge cache. The smartphone companion node 630 may also broadcast the message from the smartphone 611 across the network using the LPWAN connection 442 at 903. The infrastructure node 640 may receive and rebroadcast the message at 904, as the message is new, as well as store the received message in the local edge cache. The smartphone companion node 630 may receive the message but drop the message because the message is in the edge cache. The smartphone companion node 650 may receive and rebroadcast the message at 905, as the message is new, as well as store the received message in the local edge cache. The infrastructure node 640 may receive the message but drop the message because the message is in the edge cache. The smartphone 612 may send an HTTP GET request to the smartphone companion node 650 at 906 to request the list of all messages. The smartphone companion node 650 may return the list of all messages to the smartphone 612 at 907. The smartphone 612 may then resolve the edge cache message list with the internal memory message list and present the resolved internal memory message list to the user 992 through the GUI 1100 at 908.

Figure 10:
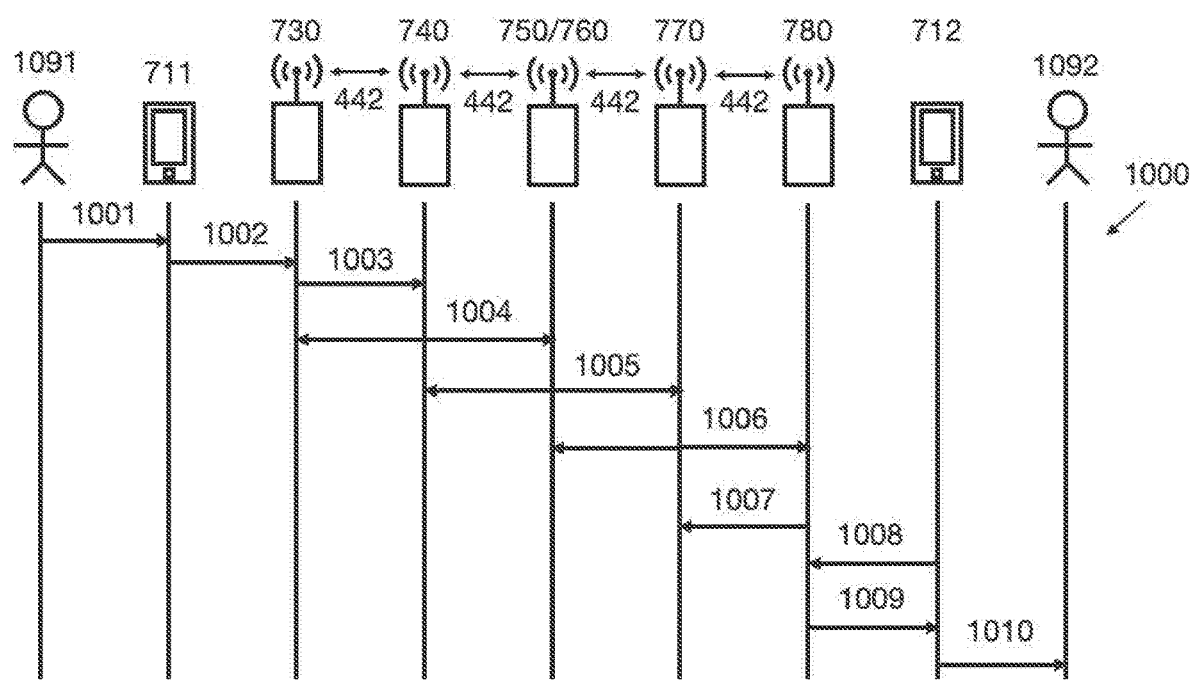
FIG. 10 illustrates a messaging sequence between users, smartphones, smartphone companion nodes, and infrastructure nodes for human-to-human communication, according to an embodiment.

FIG. 10 illustrates a messaging sequence between users 1091 and 1092, smartphones 711 and 712, smartphone companion nodes 730 and 780, and infrastructure nodes 740, 750, 760, 770 for human-to-human communication, according to an embodiment. The messaging sequence may provide for the transport of messages between HIDs, while preventing broadcast storming or receipt of duplicate messages.

The user 1091 may interact with a GUI 1100 on the smartphone 711 at 1001 to send a message. The smartphone 711 may send an HTTP POST request containing the message from 1001 to the smartphone companion node 730 at 1002. The smartphone companion node 730 may store the received message from 1002 in the local edge cache. The smartphone companion node 730 may also broadcast the message from the smartphone 711 across the network using the LPWAN connection 442 at 1003. The infrastructure node 740 may receive and rebroadcast the message at 1004, as the message is new, as well as store the received message in the local edge cache. The infrastructure node 730 may receive the message but drop the message because the message is in the edge cache. The infrastructure nodes 750 and 760 may receive and rebroadcast the message at 1005, as the message is new, as well as store the received message in the local edge cache. The infrastructure node 740 may receive the message but drop the message because the message is in the edge cache. The infrastructure node 770 may receive one of the messages from 1005 and rebroadcast the message at 1006, as the message is new, and also store the received message in the local edge cache. However, the second message to be received by infrastructure node 770 may be dropped because the message is in the edge cache. The infrastructure nodes 750 and 760 may receive the message but drop the message because the message is in their edge caches. The smartphone companion node 780 may receive and rebroadcast the message at 1007, as the message is new, and also store the received message in the local edge cache. The infrastructure node 770 may receive the message but drop the message because the message is in the edge cache. The smartphone 712 may send an HTTP GET request to the smartphone companion node 780 at 1008 to request the list of all messages. The smartphone companion node 780 may return the list of all messages to the smartphone 712 at 1009. The smartphone 712 may then resolve the edge cache message list with the internal memory message list and present the resolved internal memory message list to the user 1092 through the GUI 1100 at 1010.

Figure 11:
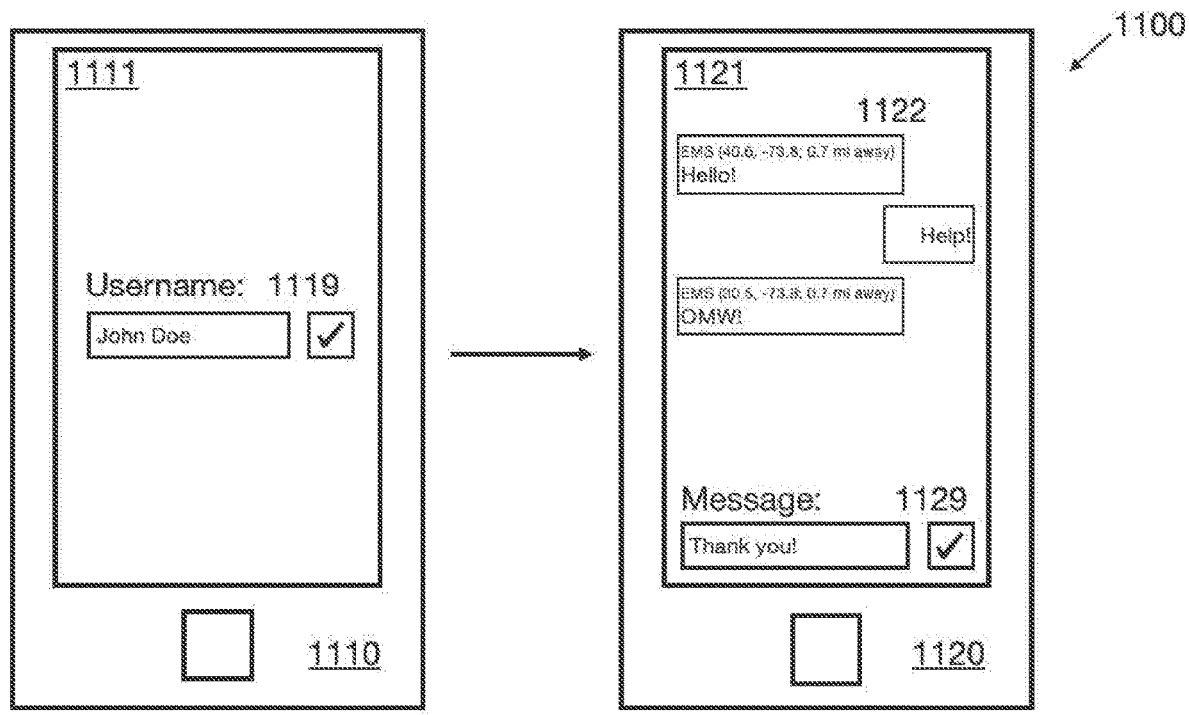
FIG. 11 illustrates a graphical user interface (GUI) executed on a human interface device (HID), according to an embodiment.

FIG. 11 illustrates a graphical user interface (GUI) 1100 executed on a human interface device (HID) 1110/1120, according to an embodiment. The GUI may provide for a user to interact with the system via a HID.

By way of example, the HID can include smartphones, tablets, laptops, or others. The user may use the credential form 1119 to enter the desired username on a login screen GUI 1111. The login screen GUI 1111 may then change to a messaging system GUI 1121. In the messaging system GUI 1121, the user can see all messages 1122 in the reconciled edge cache, as well as send new messages 1129.

Figure 12:
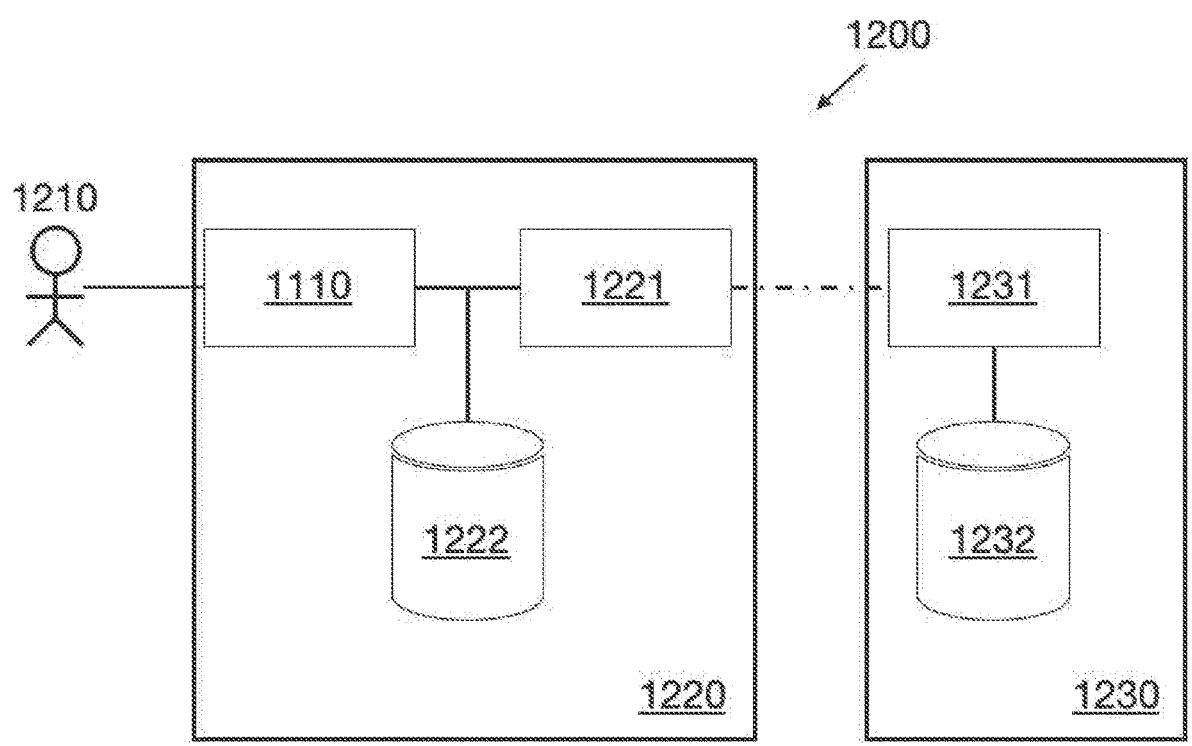
FIG. 12 illustrates a smartphone software application interacting with a long-range bearer, according to an embodiment.

FIG. 12 illustrates a smartphone software application interacting with a long-range bearer 1200, according to an embodiment. The software application may provide for a user to interact with the system via a device.

A user 1210 may interact with a GUI 1100 on a device 1220. The GUI 1100 may instruct an HTTP client 1221 within the device 1220 to send the message that the user 1210 wishes to send. The HTTP client 1221 may communicate with an HTTP web server 1231 over a wireless medium to send the requested message. The HTTP web server 1231 may store the message sent by the HTTP client 1221 in an internal data store 1232. The GUI 1100 can also instruct the HTTP client 1221 to gather newly received messages. The HTTP client 1221 may communicate with the HTTP web server 1231 to collect the list of messages. The HTTP web server 1231 may retrieve the list of messages from the internal data store 1232 and reply to the HTTP client 1221's request with the list. The HTTP client 1221 may send the list to the GUI 1100, which may resolve the list with the list stored in the internal data store 1222. The GUI 1100 may then present the resolved list of messages to the user 1210.

Figure 13:
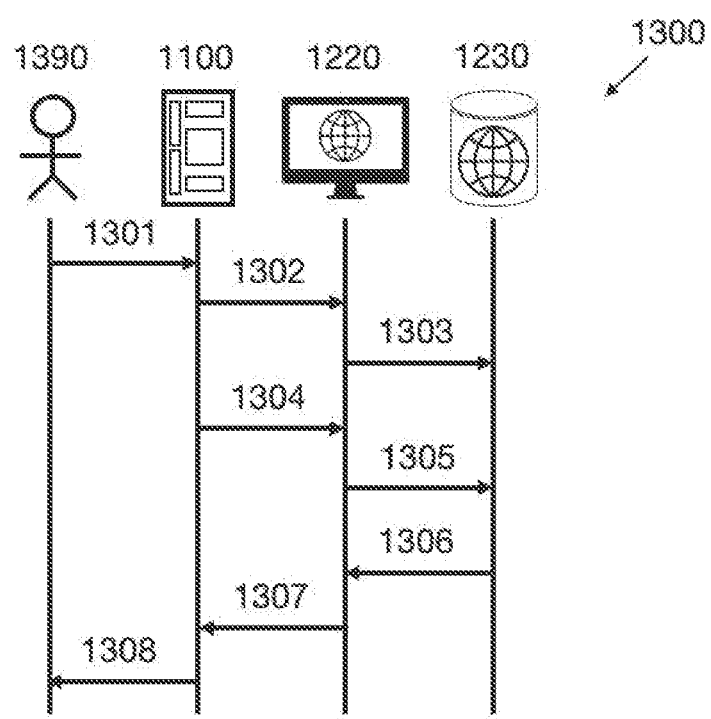
FIG. 13 illustrates a smartphone software application messaging sequence between a user, a GUI, an HTTP client, and an HTTP web server, according to an embodiment.

FIG. 13 illustrates a smartphone software application messaging sequence between a user 1390, a GUI 1100, an HTTP client 1220, and an HTTP web server 1230, according to an embodiment. The messaging sequence may provide for the transport of messages between HIDs, as well as an ability to request, and respond to requests for, lists of messages.

The user 1390 may interact with the GUI 1100 at 1301 to send a message. The GUI 1100 may communicate to the HTTP client 1220 at 1302 an instruction to send an HTTP request containing the message from 1301. The HTTP client 1220 may send an HTTP POST request containing the message from 1301 to the HTTP server 1230 at 1303. The HTTP web server 1230 may store the message from the HTTP request from 1303. The GUI 1100 may communicate to the HTTP client 1220 at 1304 to send an HTTP request to gather new messages. The HTTP client 1220 may send an HTTP GET request to the HTTP web server 1230 at 1305. The HTTP web server 1230 may reply to the HTTP GET request from 1305 at 1306 with the list of all stored messages in the HTTP web server 1230. The HTTP web client 1220 may send the list of messages received from 1306 to the GUI 1100 at 1307. The GUI 1100 may present the list of all messages received from 1307 to the user 1390 at 1308.

Figure 14:
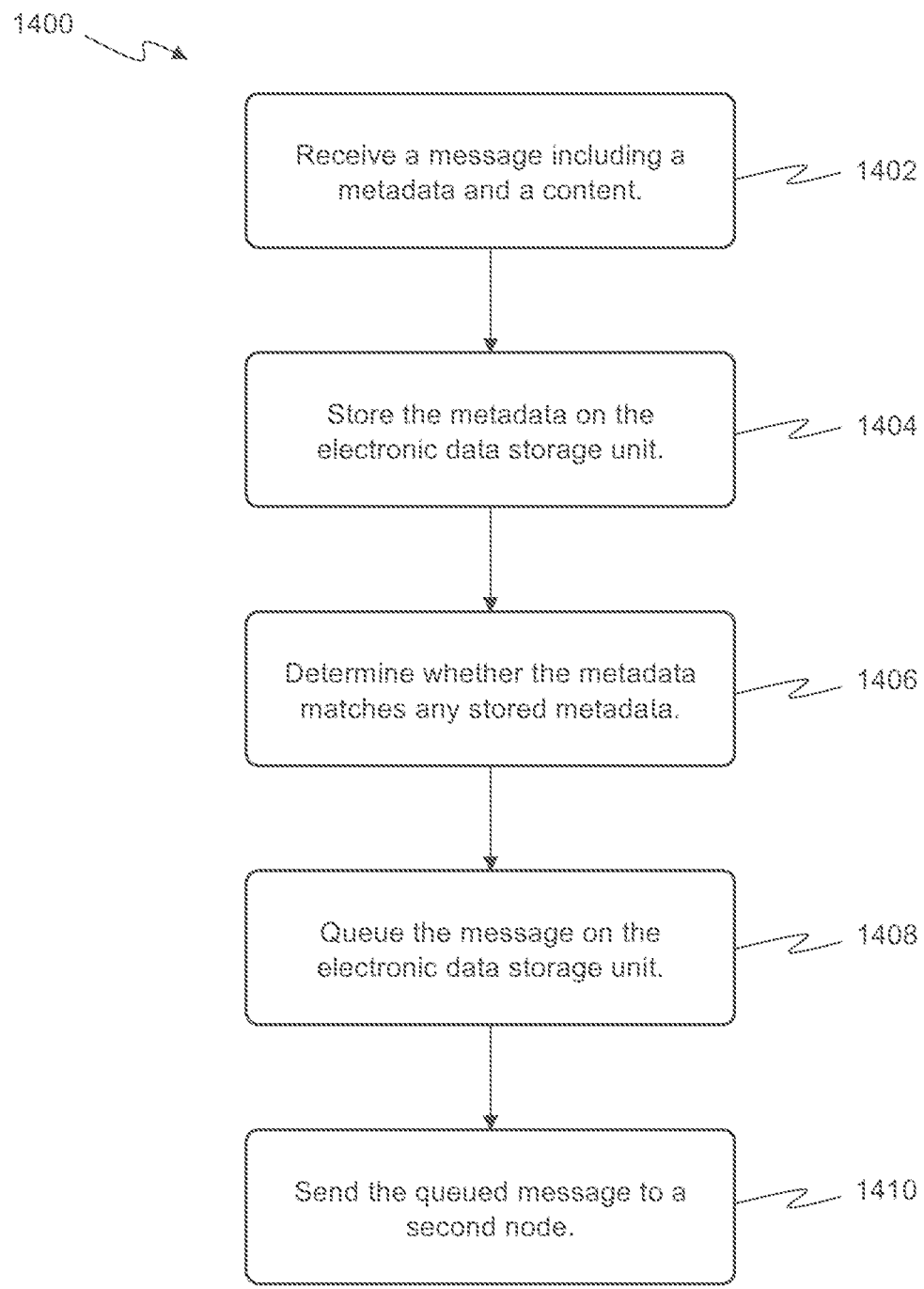
FIG. 14 illustrates a method for relaying a message at a node of a communications network, according to an embodiment.

FIG. 14 illustrates a method 1400 for relaying a message at a node of a communications network, according to an embodiment. The method 1400 may provide for transport of messages via the node, while preventing broadcast storming or receipt of duplicate messages.

At 1402, a message including a metadata and a content may be received from a sender device via a long range low-power wide area network connection operating via the network interface. At 1404, the metadata may be stored on an electronic data storage unit. At 1406, whether the metadata matches any stored metadata on the electronic data storage unit may be determined. At 1408 the message may be queued on the electronic data storage unit (e.g., provided that the metadata of the message does not match any stored metadata on the electronic data storage unit previously received by the node). At 1410, the queued message may be sent to a second node via the long range low-power wide area network connection. Various steps of the method 1400 may be performed on a processing device as described herein, which may form part of a SoC as described herein.

A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e., methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely example. Particular implementations may vary from these example details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower or equal in scope to the original claims, are to be considered within the subject matter of the examples described herein.

The invention claimed is:

1. A method, comprising:
    transmitting, via a communication mechanism of a first node, a first message including metadata and content to a first processing device;
        the first processing device composing a multi-bearer internet-of-things microcontroller of the first node;
        the first node composing a person-to-person short messaging private network configured as a fully-decentralized mesh transport network having a plurality of nodes;
    storing, via the first processing device, a listing of the first message in a first message list of an edge cache of the first node by a first in first out queuing means, wherein the first message comprises a first global position system (GPS) coordinate;
    transmitting, by a network interface of the processing device via long-range low-power wide area network connection, the message list to a processing device of a microcontroller of a first different node of the plurality of nodes different from the first node;
    transmitting, via the communication mechanism, a message list request from the first node to the first processing device;
    in response to the message list request being transmitted to the processing device, transmitting the message list request to a processing device of a microcontroller of a second different node of the plurality of nodes different from the first node, wherein the processing device of the microcontroller of the second different node of the plurality of nodes is at least temporarily experiencing backbone connectivity issues;
    in response to transmitting the message list request to a processing device of a microcontroller of a second different node, receiving, by the network interface of the processing device, via long-range low-power wide area network connection, a second message list from the processing device of the second different node, wherein the second message comprises a second GPS coordinate;
    determining, by the first node, whether the second message list includes messages not listed in the first message list;
    determining a distance between a user of the first node and a user of the first different node based on the first GPS coordinate and the second GPS coordinate;
    in response to determining that the second message list includes messages not listed in the first message list, storing the messages not listed in the first message list in the first message list; and
    displaying the messages of the first message list in a graphical user interface of the first node.

2. The method of claim 1, wherein one or more of the transmitting or receiving is via a hypertext transfer protocol POST or GET transaction over the long-range low-power wide area network connection.

3. The method of claim 1, further comprising
    periodically transmitting, via the communication mechanism of the first node, message list requests from the first node to the first processing device; and
    in response to periodically transmitting the message list requests from the first node to the first processing device, transmitting the message list requests to a multitude of nodes of the plurality of nodes different from the first node.

4. The method of claim 1, wherein the first message list is sent, using the processing device, to a multitude of nodes of the plurality of nodes different from the first node.

5. The method of claim 1, wherein the receiving the second message list comprising storing the second message list on an electronic data storage unit of the first node, the method further comprising:
in response to determining that the second message list includes messages not listed in the first message list, preventing, using the first processing device processor, any further propagation of the second message list; and
deleting, using the first processing device, the second message list from the electronic data storage unit.

6. The method of claim 5, wherein the preventing any further propagation of the second message list and the deleting the second message list from the electronic data storage unit prevents broadcast storming from overwhelming the person-to-person short messaging private network and frees up storage space on the electronic data storage unit.

7. The method of claim 1, wherein metadata of the first message includes the first GPS coordinates of the user of the first node.

8. A system, comprising:
a node, comprising:
a processing device configured to:
receive an input message from a human-machine interface, wherein the input message comprises a first global position system (GPS) coordinate;
receive a network message from a network interface;
store the input message in an edge cache of an electronic data storage unit by a first in first out queuing means;
broadcast the input message using the network interface;
determine whether the network message matches any message in the edge cache, wherein the network message comprises a second GPS coordinate;
in response to the network message not matching any message in the edge cache, store the network message in the edge cache by a first in first out queuing means;
broadcast a list of messages stored in the edge cache; and
wherein the processing device is at least temporarily experiencing backbone connectivity issues;
the electronic data storage unit in electronic communication with the processing device;
the network interface comprising a long range low-power wide area network connection in electronic communication with the processing device and configured to broadcast messages; and
a power source connected to the processing device, the electronic data storage unit, and the network interface; and
the human-machine interface in electronic communication with the node, wherein:
the human-machine interface is configured to determine a distance between a user of the node and a user of a different node based on the first GPS coordinate and the second GPS coordinate;
the human-machine interface is configured to display a graphical user interface; and
the human-machine interface is configured to communicate the input message from the human-machine interface to the node.

9. The method of claim 8, wherein the system is configured to prevent broadcast storming by not rebroadcasting the message if the message is determine to be in the edge cache.

10. The system of claim 8, wherein:
the node is contained within a weather resistant package configured to be deployed in a disaster area; and
the network interface is configured to adjust a broadcast power to use the minimum amount of power needed to overcome an obstruction and successfully transmit a message.

11. The system of claim 8, wherein the node is configured as part of a software edge caching system, thereby enabling the system to be established rapidly in a disaster emergency.

12. The system of claim 8, wherein
the node is configured to communicate with an external long-range bearer; and
the long-range bearer may communicate with the mesh network of the system.

13. The system of claim 8, further comprising:
a second graphical user interface operating on a receiver device;
wherein the receiver device is configured to receive the broadcasted message; and
wherein the second graphical user interface is configured to display the message, thereby completing an end-to-end short message delivery from the human-machine interface to the receiver device.

14. The system of claim 8, wherein:
the human-machine interface is a human-machine interface of a sender device;
the sender device is a smartphone, a tablet, or a laptop computer;
the node comprises a system-on-a-chip comprising the processing device and the electronic data storage unit; or
the power source is a smartphone, a battery, a solar cell, a power grid connection, or a fuel cell.

15. The system of claim 14, wherein the system-on-a-chip is in electronic communication with the power source and disposed within a watertight packaging.

16. The system of claim 8, wherein the node is disposed within a weather-resistant and shock-resistant packaging capable of surviving a fall from a typical airplane altitude.

17. The system of claim 8, wherein the processing device is configured to recognize an instruction to perform a task in the message and perform the task.

18. A method, comprising:
receiving, at a processing device of a multi-bearer internet-of-things microcontroller, from a sender device via a long-range low-power wide area network connection operating via a network interface, a message including metadata and content by a first in first out queuing means;
determining whether the message matches any stored message in an edge cache of an electronic data storage unit of the first node, wherein the message comprises a first global position system (GPS) coordinate and the stored message comprises a second GPS coordinate;
in response to determining that the message does not match any stored message, sending, using the processing device, the message to a second node via the long range low-power wide area network connection;

determining, using the processing device, a distance between a user of the first node and a user of the second node based on the first GPS coordinate and the second GPS coordinate;

wherein the sender device is a smartphone having a graphical user interface for user input and configured to interface with the person-to-person short messaging private network via a smartphone companion node, and wherein the processing device is at least temporarily experiencing backbone connectivity issues.

19. The method of claim 18, wherein:

the smartphone companion node is integrated within the smartphone; or the smartphone companion node is connected to the smartphone via a port of the smartphone.

20. The method of claim 18, further comprising, storing, using the processing device, the message in the edge cache for comparing a future message to the message.

* * * * *